United States Patent
Fresko et al.

(10) Patent No.: US 7,765,560 B2
(45) Date of Patent: Jul. 27, 2010

(54) OBJECT ORIENTED COMMUNICATION BETWEEN ISOLATES

(75) Inventors: Nedim Fresko, San Francisco, CA (US); Chihiro Saito, Saint Petersburg (RU)

(73) Assignee: Oracle America, Inc., Redwood City, CA (US)

(*) Notice: Subject to any disclaimer, the term of this patent is extended or adjusted under 35 U.S.C. 154(b) by 1309 days.

(21) Appl. No.: 11/259,996

(22) Filed: Oct. 26, 2005

(65) Prior Publication Data

US 2007/0094676 A1   Apr. 26, 2007

(51) Int. Cl.
*G06F 3/00* (2006.01)
*G06F 9/44* (2006.01)
*G06F 9/46* (2006.01)
*G06F 13/00* (2006.01)

(52) U.S. Cl. ..................................... 719/330
(58) Field of Classification Search .................. 719/330
See application file for complete search history.

(56) References Cited

U.S. PATENT DOCUMENTS

| | | | |
|---|---|---|---|
| 5,999,988 | A | 12/1999 | Pelegri-Llopart et al. |
| 6,829,772 | B2 | 12/2004 | Foote et al. |
| 6,938,263 | B2 | 8/2005 | Wollrath et al. |
| 2003/0084202 | A1 | 5/2003 | Kawahara |

OTHER PUBLICATIONS

Eric Giguere, Getting Started wiht Inter-Xlet Communication (IXC), Feb. 5, 2003, Sun Microsystems, pp. 1-4.*

Palacz et al., "Incommunicado: Efficient Communication for Isolates", OOPSLA '02, Nov. 4-8, 2002, Seattle, Washington, USA, Copyright 2002.

Sun Microsystems: "JSR-217 Personal Basis Profile Specification, Version 1.1," Sun Microsystems, Apr. 23, 2004, p. 1-8, XP002416002, http://jcp.org/aboutJava/communityprocess/edr/jsr217/index.htm.

Sun Microsystems: "JSR-121 Application Isolation API Specification," Sun Microsystems, Jul. 18, 2005, p. 1-5, XP002416003, http://jcp.org/aboutJava/communityprocess/pr/jsr121/index.html.

"RFE: Monaco introduces limitation on number of objects in IXC registry," Sun Microsystems Bug Database, Apr. 28, 2005, p. 1-1, XP002416004, http://bugs.sun.com.bugdatabase/view_bug.do?bug_id=6263136.

"RFE: IxcRegistry.unbindAll ( ) for 1.1. specification," Sun Microsystems Bug Database, Mar. 10, 2003, p. 1-1, XP002416005.

* cited by examiner

*Primary Examiner*—Hyung S Sough
*Assistant Examiner*—KimbleAnn Verdi
(74) *Attorney, Agent, or Firm*—Martine Penilla & Gencarella, LLP

(57) ABSTRACT

A computer implemented method and machine readable media for managing a registry of bound objects for inter-Xlet communication (IXC) is described. A request from a first Xlet to bind an exported object name with a remote reference is received. A number of objects exported by the first Xlet is compared with a maximum number. If the number of objects exported is less than the maximum number then a binding is added for the exported object name and the remote reference. If the number of objects exported is greater than the maximum number, then the request is denied.

23 Claims, 6 Drawing Sheets

OBJECT ORIENTED COMMUNICATION BETWEEN ISOLATES

CROSS-NOTING TO RELATED APPLICATIONS

This Application is related to commonly-assigned U.S. patent application entitled "Object Oriented Communication Between Isolates," and was filed on the same day as this Application.

BACKGROUND

Computer systems for connected devices such as cell phones, personal data assistants (PDAs) and set top boxes for televisions are becoming more flexible. Newer systems allow software to be downloaded and executed. The downloaded software may not be entirely trustworthy and yet may share resources with existing, trusted software. Various techniques have been proposed and implemented to therefore restrict the access of untrusted software to prevent it from disrupting the operation of the system. However, the purpose of these systems is at odds with another goal of allowing software components to communicate with one another.

One known mechanism for allowing software components to communicate with one another is the Remote Procedure Call (RPC). This mechanism allows a computer program running on one host to cause code to be executed on another host and return the results to the first program. Typically, RPC protocols are used to implement a client-server model of distributed computing.

Various editions of the JAVA™ Platform provide a mechanism known as Remote Method Invocation (RMI) for performing an RPC to communicate between objects. In RMI, the methods of remote JAVA™ objects can be invoked from another Java virtual machine, possibly on a different host. As depicted in FIG. 1, RMI 100 essentially allows communication between JAVA™ Virtual Machine (JVM) A 102, and JVM B 104. JVM A 102 and JVM B 104 may be running on the same physical machine, or may be running on different machines and connected over a local area network (LAN) or an Internet Protocol (IP) network connection or other communication medium. The application program interface (API) that implements RMI 100 handles the details of the communication between virtual machines.

Because RMI includes all the necessary components and security measures for communicating between different machines over different protocols, RMI is complex and can be unwieldy for small devices, as RMI provides many features that are simply not needed in most connected devices. Therefore, the RMI API is not included in the Personal Basis Profile (PBP) for JAVA™ 2 Platform Micro Edition (J2ME).

The conventional model for JAVA™ applications assumes that only one application is executing in a given virtual machine, and this application is in complete control of its lifecycle, which can include killing the virtual machine it is running in. To accommodate the limited processing and memory resources available in the typical connected device and yet allow multiple programs to run concurrently, the JAVA™ Community Process (JCP) has proposed the use of a programming model referred to as Xlets.

Xlets are similar to applets, which can be run by an Internet web browser, or servelets, which can be run by a web server, in that a plurality of Xlets can run at the same time in a single JVM, and their lifecycle can be controlled by another program. In the case of applets, the other program is generally a web browser. Running multiple programs in a single instance of a JVM can improve overall system performance and scalability by sharing some of the virtual machine's internal data structures. Xlets may be managed by a stand-alone application manager.

Since a plurality of Xlets may be operated by a single JVM, a mechanism was deemed necessary to protect sets of Xlets that may be harmed by a malicious downloaded Xlet. Thus, the concept of a Logical Virtual Machine (LVM) was developed. The LVM is a resource context structure that provides a mechanism for referencing the code from one or more programs that share the same resource or object. Associating related threads with a particular LVM allows the related threads to be terminated together when they start to misbehave, e.g., by causing a denial of service attack.

However, protecting Xlets by separating them into different LVMs meant placing them out of communication with each other, which is undesirable. Therefore, some mechanism was required to permit Xlets to communicate to each other from between different LVMs or, more generically, resource domains. U.S. Pat. No. 6,829,772, issued Dec. 7, 2004 and hereby incorporated by reference, presents a method now referred to as Inter-Xlet Communication (IXC) that allows Xlets to communicate with each other from different LVMs. It should be noted that, when that patent was filed, the term "Xlet" had yet to be coined and so Xlets are referred to therein by the term "applets," which was used generically.

The IXC API is now part of the J2ME PBP. FIG. 2 represents IXC 110 between two Xlets, Xlet A 112 and Xlet B 114, which each reside in different LVMs. However, this IXC implementation is limited to what is referred to as a single-process, multi-virtual machine (MVM) paradigm. In this paradigm, each LVM 116, 118 is executed in a single process JVM 120 and shares a common address space. The IXC implementation (not shown) takes advantage of the common address space for sharing instances between each LVM.

An isolation context for executing Xlets is now termed "isolate." In one realization of isolates, each isolate runs in its own process and therefore has its own address space. This may be referred to as the "multiple process, MVM" paradigm. The JAVA™ Application Isolate API is defined in JAVA™ Specification Request 121 (JSR-121) which is incorporated herein by reference. Because the previous mechanism for IXC relied on a common address space among Xlets, it is not structurally possible to implement in this new paradigm.

Thus, a new IXC mechanism is needed that will provide required security measures to prevent denial of service attack, while at the same time permit RPCs between Xlets located in different isolates on a common JVM. The new mechanism should also provide reliable garbage collection and efficient type checking. Furthermore, the IXC implementation should be optimized for an isolate implementation wherein isolates exist on the same machine, but in separate address spaces.

SUMMARY

Broadly speaking, the present invention fills these needs by providing a method and machine readable media providing object oriented communication between isolates.

It should be appreciated that the present invention can be implemented in numerous ways, including as a process, an apparatus, a system, a device, or a method. Several inventive embodiments of the present invention are described below.

In one embodiment, a computer implemented method and machine readable media for managing a registry of bound objects for inter-Xlet communication (IXC) is provided. A request from a first Xlet to bind an exported object name with a remote reference is received. A number of objects exported by the first Xlet is compared with a maximum number. If the number of objects exported is less than the maximum number then a binding is added for the exported object name and the remote reference. If the number of objects exported is greater than the maximum number, then the request is denied.

In another embodiment, a method for inter-Xlet communication (IXC) is provided in which a remote reference to an exported object from a first Xlet in a first isolate to an object registry located outside the first isolate. The remote reference is bound to a name of the exported object in the object registry. A request is received by the object registry from a second Xlet in a second isolate for the remote reference of the exported object. In response, the remote reference is forwarded to the second Xlet. A stub object is generated for the second Xlet, the stub being in communication with the exported object. The object registry limits each Xlet to a number of bindings.

In yet another embodiment, a computer readable media having program instructions for object oriented inter-Xlet communication (IXC) between isolates is provided. The computer readable media comprises program instructions for exporting an object from a first Xlet, the exporting comprising sending a request from the first Xlet to an object registry to bind a name of the exported object with a remote reference, program instructions for comparing a number of objects exported by the first Xlet with a maximum number, program instructions for adding a binding to the object registry for the name of the exported object and the remote reference when the number of objects exported is less than the maximum number, and program instructions for denying the request when the number of objects exported is not less than the selected maximum number.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements, wherein.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

This invention relates to object-oriented communication between isolates. An isolate is a protected domain within a computer system that protects one or more threads from being adversely affected by other, potentially malicious, threads operating on the system. In the JAVA™ Specification Request 121 (JSR-121), which is incorporated herein by reference, an isolate is described as a construct midway between threads and JAVA™ Virtual Machines (JVMs). More specifically, an isolate in the context of the JAVA™ personal basis profile, is an instance of the Isolate class, which encapsulates an application or component, and provides the means to start and stop an isolated computation. For example, isolates can be used to initiate concurrent execution. Like JVMs, they cause execution of a "main" method of a given class to proceed within its own system-level context, independently of any other JAVA™ programs that may be running. Thus, isolates differ from threads by guaranteeing lack of interference due to sharing statics or per-application run-time objects (such as the Abstract Window Toolkit thread and shutdown hooks), and they differ from JVMs by providing an Application Programming Interface (API) to create, start, terminate, monitor, and communicate with these independent activities. Isolates may operate transparently to the application operating within them. For the purpose of this disclosure, the term "isolate" may be simply used to identify a protected domain in a virtual machine, that runs in its own process and therefore has its own address space.

Object oriented communication refers to communication between software objects. A software object is a software construct comprising executable code and data, which is held in variables. The data is protected within the object and can be accessed using methods provided by the object. The methods can be invoked by other objects to carry out a procedure. The methods can be interfaces provided by the object to the variables or they can carry out operations on behalf of the calling object. In this way, object methods are similar to functions or subroutines in procedural languages. Communication between objects occurs by one object sending a message to a second object to invoke a method in the second object. Any result from the method is then returned to the invoking object.

Figure 1:
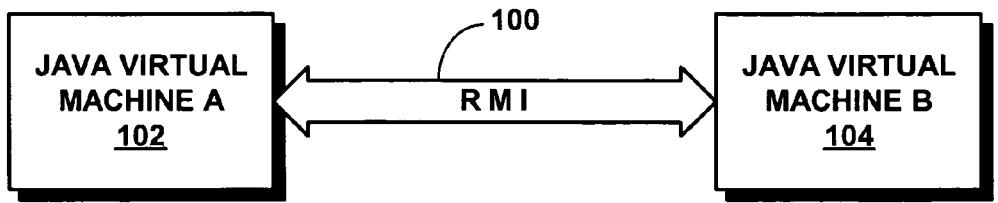
FIG. 1 shows an exemplary prior art configuration for remote method invocation (RMI).
Figure 2:
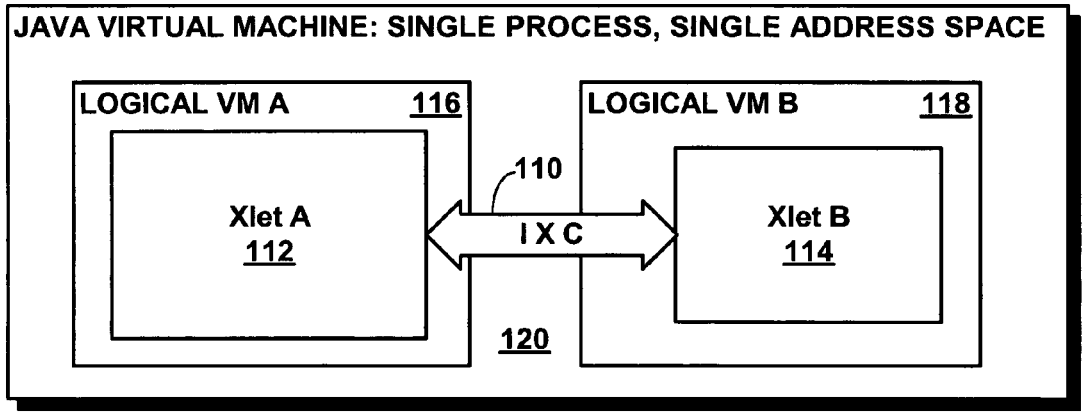
FIG. 2 shows an exemplary prior art configuration for inter-Xlet communication (IXC).
Figure 3:
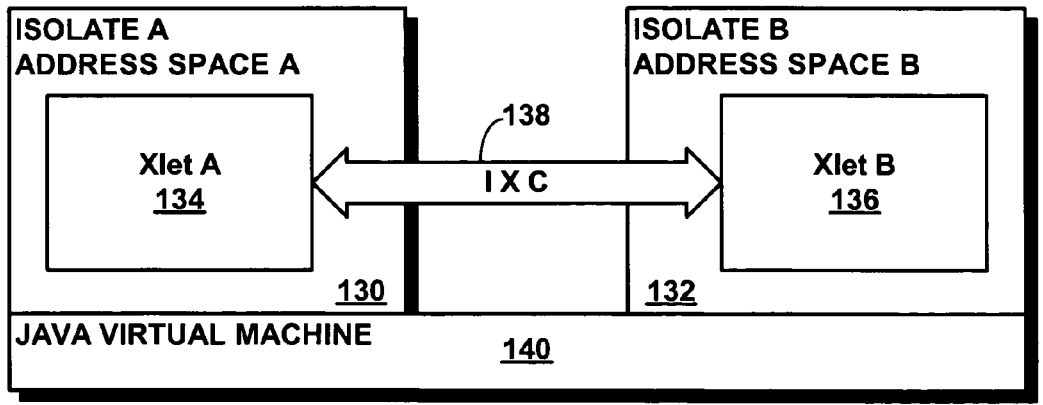
FIG. 3 shows an exemplary configuration for IXC between isolates.

FIG. 3 shows an exemplary configuration for inter-Xlet communication (IXC) between isolates in which a first isolate A 130, and a second isolate B 132 are instantiated by an application manager (not shown) using JVM 140. Each isolate 130, 132 has an Xlet 134, 136 executing within it. Each Xlet comprises one or more objects (not shown). JVM 140 exists within a single machine and provides common resources for each isolate 130, 132, each operating in a separate process and address space within the system. JVM 140 includes a plurality of APIs, including an isolate API for creating and destroying isolates, and an IXC API providing IXC 138 between Xlet A 134 and Xlet B 136. As will be described in more detail below, IXC 138 allows Xlet B to invoke a method in an object of Xlet A, and receive a response. While FIG. 3 shows a common JVM 140, it is also possible for Xlet A and Xlet B to reside in separate JVMs.

It will be noted that, while various embodiments of the invention mention in particular JVM and the JAVA™ programming language, the invention may be ported to other object-oriented programming languages and other virtual machines. It is therefore should not be construed as being limited to JAVA™. Furthermore, the term, "Xlet" is intended to refer to a type of object-oriented application that can share a protected domain or virtual machine with other applications, and whose lifecycles may be managed by an external program, such as an application manager. The term "Xlet" as used herein is generic and includes applets and servelets, as well as other analogous programming models.

Figure 4:
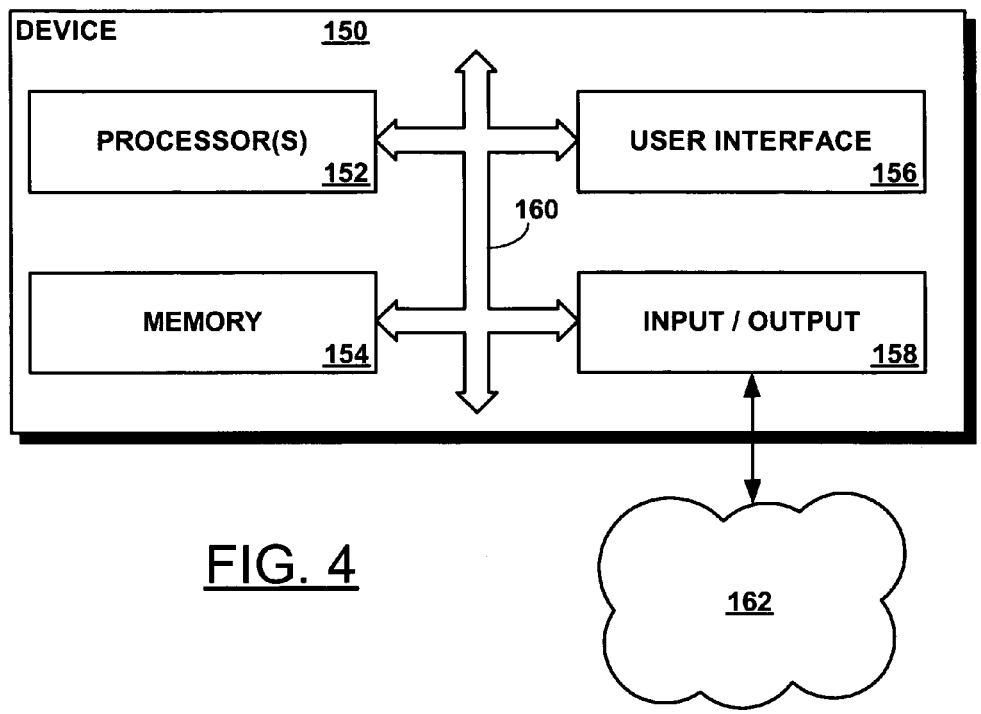
FIG. 4 shows an exemplary device in which the invention may be implemented.

FIG. 4 shows an exemplary device 150 in which the invention may be implemented. In one embodiment, device 150 is a connected device, which means it may be connected to an external network or system at least occasionally. Device 150 comprises at least one processor 152, memory 154, a user interface 156, and an input/output system 158, which are all in communication with each other via data bus 160. Depending on the intended application, processor 152 may be a single core or multi-core processor and may comprise multiple processors. Processor 152 may be optimized for low power consumption for hand-held devices such as personal data assistants and mobile telephones, or may be optimized for speed for processor-intensive activities, as would be found in a computer workstation or server. Device 150 may include other components (not shown) depending on the intended use of the device. For example, if device 150 is a cell phone, it may include voice communication components. If device 150 is a television set top box, it may include a receiver and video processing circuitry.

Memory 154 may comprise a single block of randomly-accessible memory (RAM), which may be volatile, such that it cannot retain information when power is disconnected. Alternatively, memory 154 may comprise segmented or multi-layer memory including volatile RAM, non-volatile RAM, such as FLASH memory, and/or non-volatile mass storage. Memory 154 may furthermore include read-only memory (ROM) for storing the device's basic input/output system (BIOS), operating system components, and/or various software applications and utilities. Memory 154 may be fixed within device 150 or may be removable. For example, memory 154 may include removable storage devices such as that sold under the trademarks "COMPACTFLASH" "MEMORY STICK" and "SD CARD". If memory 154 includes removable memory, new software may be added to memory 154 using an outside system 162 such as a computer or network. The new software may then be executed on processor 152 to provide device 150 with additional functionality.

User interface 156 may comprise various elements for providing output to a user and input from a user. For example, on the output side, user interface 156 may comprise a small liquid crystal display (LCD) for a portable device and a speaker, or a high-resolution display for a computer workstation. For a set-top box, the user interface 156 may include a video and audio outputs that could overlay application information on top of a video and audio signal. On the input side, user interface 156 may include a keypad, touchscreen, a full-sized keyboard, a remote control, voice activation, and/or any number of other user inputs that provide user interactivity.

In one embodiment, device 150 includes input/output system 158, which provides communication to the outside world. Specifically, device 150 may be continuously or occasionally connected to outside system 162, which may be a network, computer system, or other device. In particular, outside system 162 could comprise a local area network (LAN) a wide area network (WAN) such as the Internet, or a remote computer or interface device. Network or outside system 162 is capable of downloading executable software to device 150.

In operation, JVM 140 (FIG. 3) is loaded into (or already resides) in memory 154 and is executed in processor 152. JVM 140 provides a virtual machine for executing JAVA™ bytecode, which also resides in memory 154. The JAVA™ bytecode is interpreted or just-in-time (JIT) compiled using JVM 140 to provide functionality to device 150. Device 150, may, for example, include JAVA™ software for downloading other JAVA™ software and cause the other software to be executed. In one embodiment, JVM 140 includes an application manager for loading, starting, and ending Xlets, which provide functionality to the device.

Figure 5:
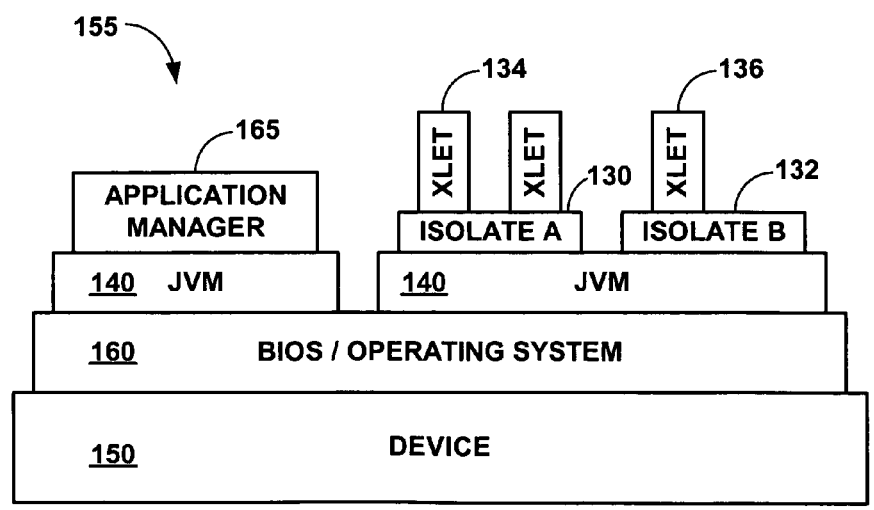
FIG. 5 shows exemplary hardware and software layers for executing Xlets on a device.

FIG. 5 shows exemplary hardware and software layers 155 for executing Xlets on device 150. At the lowest level is connected device 150 hardware, which includes various components discussed above with respect to FIG. 4. Above the hardware layer is a BIOS/OS layer 160. The BIOS and OS may exist as separate software layers or may be integrated and are generally responsible for driving various hardware components such as the user interface etc. in response to calls by higher software layers. Above BIOS/OS layer 160 are one or more JVM layers 140. The JVM layers 140 each provide an independent platform for executing, by interpreting and/or by compiling, e.g., JIT compiling, application software such as Application Manager 165 or Xlets 134, 136. As described above, JVM layers 140 can also instantiate isolate layers 132 to provide a protected environment for Xlets 134, 136.

Figure 6:
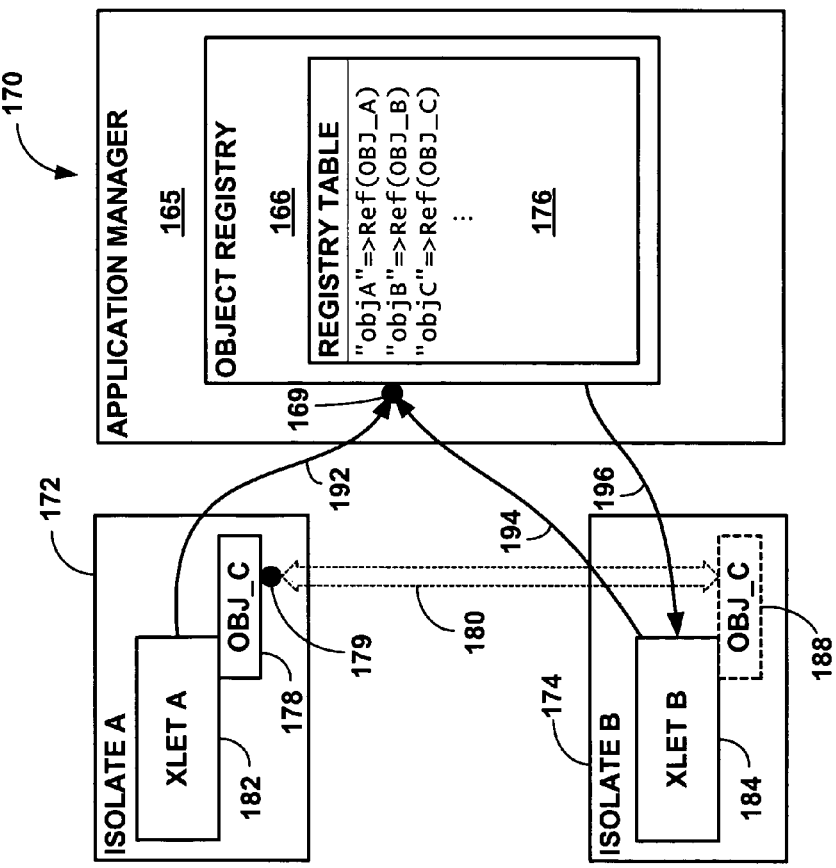
FIG. 6 presents a schematic diagram illustrating an exemplary implementation of IXC between isolates.

FIG. 6 presents a schematic diagram 170 illustrating an exemplary implementation of IXC between isolates. This programming model has commonalities to other remote method invocation models. For illustration purposes, two isolates, isolate A 172 and isolate B 174 are shown. Isolate A 172 contains an Xlet A 182 that provides certain functionality to other Xlets operating in the device. For example, Xlet A 182 may provide an address book look-up functionality, which Xlet B 184 needs to access to find the phone number or email address of a particular individual. Xlet A 182 and Xlet B 184 agree on an interface for this communication. The interface may be, for example, a particular object having a particular method with particular parameters for a query, and a particular variable type for the desired response. Xlet A 182 provides an object OBJ_C having the necessary methods expected by Xlet B 184.

To make OBJ_C available and accessible to other Xlets, Xlet A 182 sends a message 192 containing a remote reference to object registry 166. Xlet A 182 maintains the infrastructure so it can answer requests on OBJ_C that it just exported. The registry is provided in an expected location or is otherwise made available to all Xlets operating on the system. In one embodiment, the registry is itself a remote object exported by application manager 165, which exists in a different process. In this case, the remote reference to registry is defined as a constant by the JVM API. The remote reference sent by Xlet A 182 to object registry 166 contains a name of the object a remote reference to the object, and a description of the object. The description can include details of the interface or just a unique identifier of these details, such as a hash code. Object registry 166 maintains a registry table 176, which is located somewhere on the system. The registry table 176 is contains a list of names and associated remote object references. The registry table therefore binds the name of each exported object to a reference to the exported object.

In one embodiment, the remote reference includes 4 data elements: an exporting Xlet identifier, an exporting Xlet endpoint identifier, an exported object identifier, and an interface descriptor. The Xlet identifier may be a name of the exporting Xlet. The Xlet endpoint identifier may be a port number or other representation of an address using whatever communication process is implemented. The port number, for example, may identify the location of the exporting JVM instance which can then forward calls to the exported object by the Xlet identifier and exported object identifier. The exported object identifier may be a name of the exported object. The interface descriptor may include, for example, a list of interface names, and for each interface name, a list of codes based on a method name, parameter type(s) for the method, and return type for the method. The codes may be, for example, hash codes, which are fixed-length codes representative of variable-length inputs. Instead of hash codes, the entire method name and types may be provided. In another embodiment, the remote reference does not include an interface descriptor and instead includes an interface identifier which can be used to access an interface descriptor, which is separately registered by the registry. The provision of this information allows importing Xlets to compare details of the expected interface with the actual interface, thereby ensuring a match prior to communicating with remote object. This comparison is be referred to herein as "type checking." This avoids having to transmit the full type information every time a remote reference is transmitted in serialized form.

When Xlet B 174 wishes to access OBJ_C 178, it sends a message 194 to object registry 166 requesting an instance of OBJ_C. Registry 166 accesses registry table 176 and matches the request 196 with the bound remote reference.

When Xlet B 184 imports the remote reference, it goes through a process of stub generation to generate stub object 188. Stub generation is performed on the fly by the IXC API, which is part of the JVM. From the standpoint of Xlet B 184, an instance of a remote object is requested from and is provided by object registry 166. In reality, however, stub object 188 is only a shell of the original exported object 178 and operates as a proxy to that object. As far as Xlet B 184 is aware however, it has a full instance of the remote object, and can treat stub object 188 as such. However, instead of processing calls internally, stub object 188 forwards calls to the original exported object 178 and passes the result from remote exported object 178 to Xlet B 184.

In one embodiment, a stub class is generated dynamically for each object type that is imported and instantiated for each imported object to refer to the original exported object. Thus, if multiple objects are imported having the same type, the stub class for that object type generated once, and then an instance of the stub is instantiated each time an object of that type is imported. Additional details as to the mechanics of stub generation is provided in U.S. Pat. No. 6,829,772, issued to William F. Foote et al., U.S. Pat. No. 5,999,988 issued to Pelegri-Llopart et al., and U.S. Pat. No. 6,938,263 issued to Wollrath et al., all of which are incorporated herein by reference in their entirety. In general terms, the remote interface classes are loadable on both the importing and the exporting side. This means that the interface classes are "on the classpath," just like a normal class. When an interface class is loaded, the system can "introspect" the class and find its details, i.e., the methods, parameter lists, and return types. It can then generate the stub class. The mechanism for this sort of introspection is called "reflection" in JAVA™. Thus, the remote reference includes the names of the remote interfaces, since from the interface names, you can load the interface classes, and from there extract all the information you need to reproduce the interface in the stub class.

When Xlet B 184 imports a remote object thereby generating a new stub, it generates a brand new class name on the fly, instantiates it and makes it refer to the remote exported object. Stub object 188 implements the interface defined by the object descriptor. Those skilled in the art will recognize that stub generation is a process that is well known in previous IXC implementations as well as various RMI implementations.

The IXC API ensures that stub object 188 forwards method requests to the exported object 178 along some data path 180, which can be implementation-specific. For example, data path 180 may be a low level inter-process communication (IPC) mechanism provided by the operating system and hardware layers. The remote reference defines an endpoint 179 which is analogous to an address of that remote object. In this way, object registry 166 is likewise accessed by its endpoint 169. In one embodiment, endpoints 179, 169, are abstracted to a class that can be implemented on top of different transfer mechanisms, i.e., different IPC mechanisms. In another embodiment, the endpoints are closely bound to the operating system, e.g., using port numbers.

In one embodiment, remote reference 182 sent from Xlet A 182 to registry 166 is an object that contains sufficient information regarding the exported object such that the exported object can be contacted. In one embodiment, the remote reference object travels from the exporting Xlet to the registry and from the registry to the importing Xlet using JAVA™ object serialization, which is mechanism provided by the JVM to convert an object into a series of numbers, e.g., a byte array, for transmission between isolates or JVM instances. In another embodiment, the object descriptor object travels using a custom-coded procedure utilizing a lower level command structure. Persons skilled in the art will understand the various mechanisms available for converting an object into data and transmitting that data between virtual machine (VM) instances.

Figure 7:
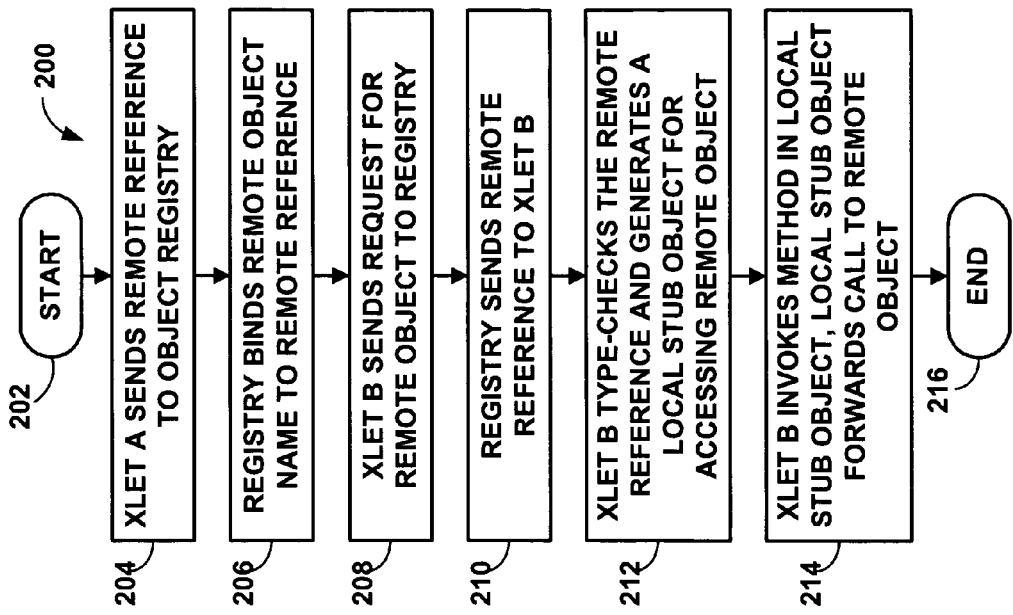
FIG. 7 shows a flowchart illustrating an exemplary procedure implementing IXC.

FIG. 7 shows a flow chart 200 representing a procedure for initiating IXC between an Xlet A and an Xlet B. The procedure begins as indicated by starting block 202 and proceeds to operation 204 wherein Xlet A exports an object by sending a remote reference of the object to an object registry. In operation 206, the registry binds the exported object name to the remote reference.

The remote reference has sufficient information to enable an Xlet in a different isolate to contact the exported object. By binding the name of the exported object to the remote reference, an Xlet in a different isolate can retrieve the remote reference by providing the name of the exported object that the Xlet wants to access, as illustrated by the following operations. From another Xlet's perspective, the exported object is a remote object.

In operations 208 through 212, Xlet B "imports" the remote object. In operation 208, Xlet B sends a request to the registry for a remote reference to the remote object exported by Xlet A. In operation 210, the registry sends the remote reference in response to Xlet B's request. In operation 212, Xlet B type-checks the remote reference by comparing a type descriptor in the remote reference to the expected interface type, thereby ensuring that Xlet B's notion of the type of the remote exported object, which Xlet B retains internally, is consistent with the actual type of the remote exported object. If the types do not match, an error is generated. If the types match, then Xlet B generates a stub object corresponding to the type of the remote object. As mentioned earlier, the stub object is a proxy to the actual remote object, and merely implements the interface of the remote object and forwards calls to and returns results from the remote object.

In operation 214 Xlet B invokes a method in the local stub object, which is forwarded by the stub object to the remote object. Any results are returned to the stub object, which then passes them back to Xlet B. The procedure then ends as indicated by ending block 216

There are various security concerns that are raised when Xlets are permitted to communicate with each other. One concern, mentioned in the Background section above, is the possibility of a denial of service (DOS) attack. A system is vulnerable to a DOS attack by malicious code when it can be so tied up in servicing requests by the malicious or malignant program that it cannot service legitimate requests from other programs. This can overload the system and prevent normal operation. In the IXC implementation described above with reference to FIGS. 6 and 7, one concern is that a malicious Xlet could make numerous requests to export numerous objects, causing the object registry to fill up thus prohibiting other Xlets from utilizing the object registry.

In one embodiment, such a DOS attack is prevented by limiting the number of bindings available in the registry from any particular Xlet. In this scheme, the registry maintains a count of the number objects exported for each exporting Xlet. If any Xlet reaches its maximum allowed number of exported objects, then any additional requests are denied.

Figure 8:
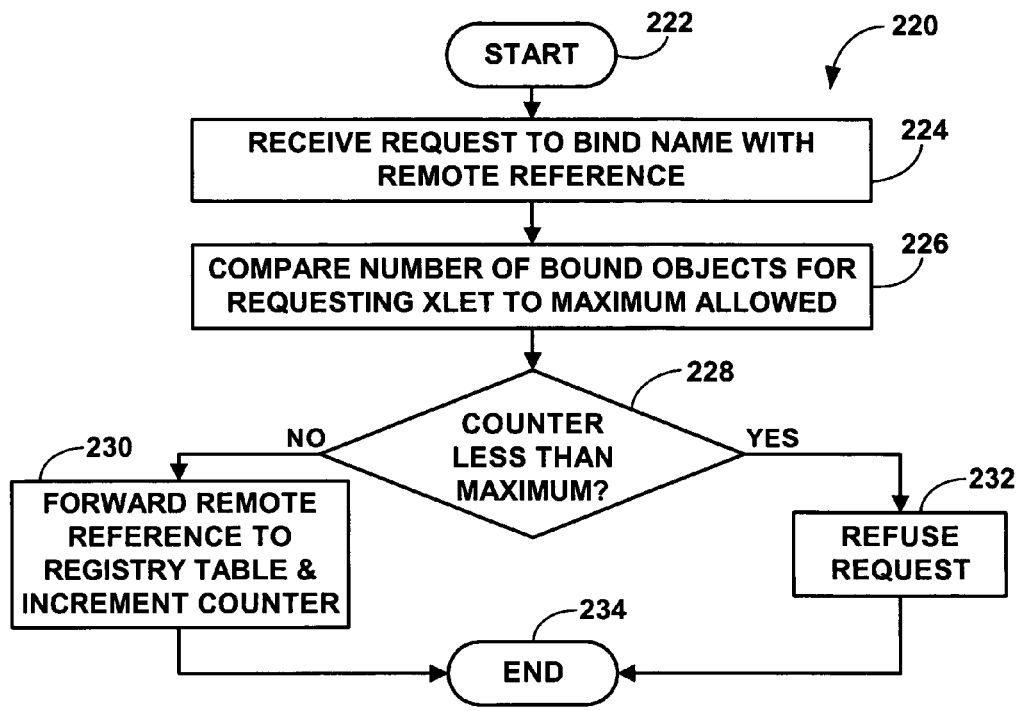
FIG. 8 shows a flowchart representing an exemplary procedure for limiting a number of bindings for each Xlet.

FIG. 8 shows a flowchart 220 representing an exemplary procedure for limiting a number of bindings for each Xlet. The procedure begins as indicated by starting block 222 and flows to operation 224 wherein a request to bind a name of an exported object with a remote reference is received. The object registry compares a count of bound objects for the requesting Xlet with a maximum number of allowed bound objects in operation 226. In operation 228, it is determined whether the counter for the number of bound objects is below the maximum allowed number. If the counter is less than the maximum, then the procedure flows to operation 230 wherein the remote reference and object name is forwarded to the registry table and the counter incremented. The procedure then ends as indicated by ending block 234. However, if, at operation 228, it is determined that the counter is not less than the maximum, then the procedure flows to operation 232 wherein the request is denied. For example, an error message is sent to the requesting Xlet that indicates a maximum number of bound exported objects has been reached. The procedure then ends as indicated by ending block 234.

As illustrated by FIG. 8, the potential problem of a malicious Xlet overloading the object registry with bogus binding requests is eliminated by limiting a number of a available bindings for each Xlet. An example limit might be 50 or 100 bindings per Xlet. This number may vary depending on resource limitations and/or other considerations specific to the particular implementation. The binding limit may be a constant value for each Xlet, or there may be some authentication mechanism whereby known trusted Xlets that require additional bindings can exceed the limit. It is also possible to limit the number of bindings for each isolate, rather than for each Xlet.

When an exporting Xlet dies, the exported objects cease to be available for processing requests from other Xlets. It therefore becomes important to update the registry table to reflect the loss of the exported objects attached to the dead Xlet. It is also helpful to notify Xlets that have imported objects from the dead Xlet to be informed that the remote object is no longer available so that any corresponding stub objects can be destroyed. This operation allows memory resources to be reallocated to other processes that require it and is often referred to "garbage collection." In the Xlet programming model, the lifecycle of individual Xlets may controlled by the application manager, which remains aware of the state of the various Xlets on the system. By maintaining a list of Xlets and objects that those Xlets have imported, the registry can provide the application manager with the information it needs to inform Xlets that have imported objects that have died of the death of the corresponding remote objects.

Figure 9:
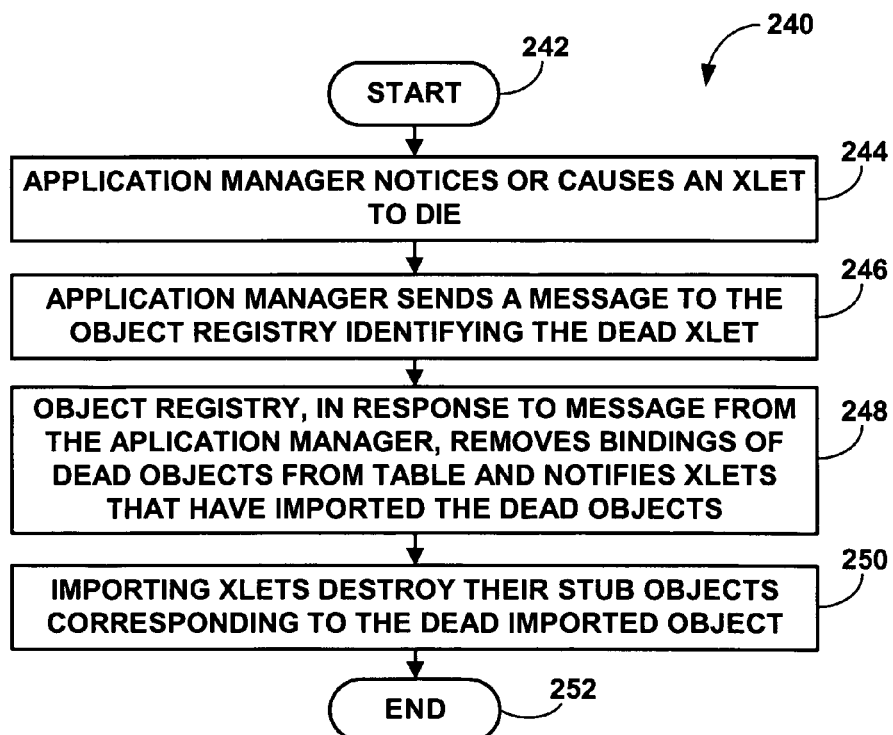
FIG. 9 shows a flowchart that depicts an exemplary garbage collection procedure.

FIG. 9 shows a flowchart 240 that depicts an exemplary garbage collection procedure. The procedure begins as indicted by starting block 242 and proceeds to operation 244 wherein the application manager notices that a particular Xlet has died. The Xlet may have died by simply ending or the application manager may have killed it. The application manager can kill applications in response to a user's request, for example, or when it determines that a particular Xlet is misbehaving, e.g., by consuming too many system resources. When the application manager notices that the Xlet has died, it proceeds to operation 246 wherein it sends a message to the object registry informing the object registry that the Xlet has died. In one embodiment, the object registry is an object that is local to the application manager and therefore the message may be passed simply by invoking a method provided by the object registry for this purpose.

In operation 248, the object registry responds to the message by removing the bindings of any objects exported by the dead Xlet. The objects exported by the dead Xlet are referred to herein as dead objects. In addition to removing any bindings to dead objects, the object registry sends a message to all the Xlets that imported any of the dead objects.

In operation 250, the importing Xlets respond to the message from the object registry by destroying stub objects corresponding to the dead objects. The procedure then ends as indicated by ending block 252. The object registry therefore maintains a list of Xlets for each bound object that have imported the bound object. When the bound object dies, it can notify all the Xlets that have imported the bound object, and remove the binding, thereby freeing up resources such as memory resources for other applications.

As described above, FIGS. 6-9 present various aspects of an exemplary implementation of IXC that relies on a central object registry. To prevent DOS attacks on the registry, each Xlet may be limited by the object registry to a selected maximum number of exported object bindings. In an alternative embodiment, the registry is distributed so that each isolate maintains a registry for objects exported from that isolate.

Figure 10:
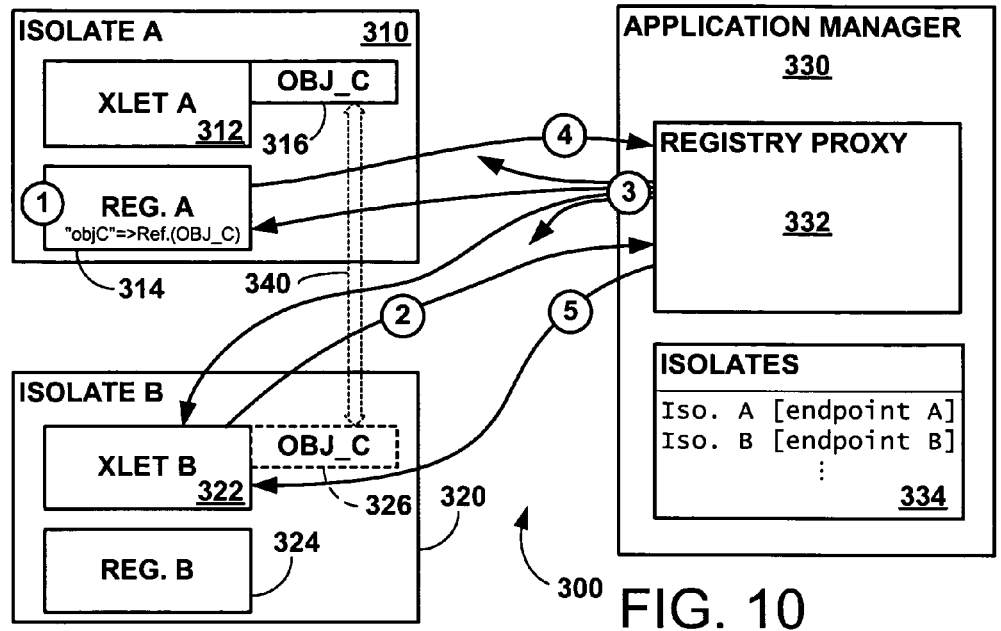
FIG. 10 shows a schematic diagram of an exemplary implementation of a distributed registry for IXC.

FIG. 10 shows a schematic diagram of an exemplary implementation of a distributed registry 300 for IXC. For illustration purposes, two isolates are shown labeled isolate A 310 and isolate B 320. Isolate A 310 has an Xlet A 312 and isolate B has an Xlet B 322. For Xlet B 322 to access OBJ_C, Xlet A 312 must first export OBJ_C 316. Xlet A 312 does this by simply adding it to exported isolate registry A 314 located in isolate A 310. Each isolate contains an exported isolate registry, as shown by way of example where isolate B 320 contains an exported isolate registry B 324. Each exported isolate registry contains a list of objects exported by Xlets in that isolate. Thus, exported isolate registry A 314 contains a list of objects and corresponding remote references bound to those objects. Xlet A does not need to do anything further to export the object OBJ_C. To Xlets outside Isolate A, OBJ_C is a remote object.

For Xlet B 322 to import OBJ_C, it first contacts registry proxy 332 to request a remote reference, what Xlet B 322 will perceive as an instance, of the remote object OBJ_C. In one embodiment, the registry proxy 332 is implemented using a set of specialized commands. In another embodiment, the registry proxy 332 is a remote object provided by application manager 330 and is contacted by IXC from other Xlets including Xlet B. In this case, Xlet B therefore must import the registry proxy object prior to contacting it to obtain import OBJ_C. To ensure that Xlets can find the registry proxy object, the remote reference to the registry proxy is a constant value provided by the JVM. In either embodiment, Xlet B 324 sends a message to registry proxy 332 requesting that it retrieve a remote reference to OBJ_C. To fulfill this request, registry proxy 332 refers to a list of isolates in isolate table 334 maintained by application manager 330, and polls each exported isolate registry in each isolate to find out if the particular object being sought is in that isolate. In one embodiment, this search of the isolates may be optimized using a consistent naming scheme. For example, each isolate may attach a unique prefix to the names of exported objects allowing the registry proxy to first search in the isolates having a prefix in common with the remote object being sought.

To prevent Xlets from exporting objects during a search, which could lead to unexpected results, the registry obtains an exclusive lock. When the registry proxy controls the lock, individual Xlets are prevented from modifying the exported isolate registries. When Xlet A exports object OBJ_C, it first obtains the exclusive lock or to ensure the registry proxy does not have possession of it. Once the registry proxy 332 finds the searched remote reference bound to the OBJ_C, it retrieves the reference from the exported isolate registry, passes it to Xlet B 322 to complete the transaction with Xlet B, and releases the exclusive lock. If the type-checking matches as described above, Xlet B 322 proceeds to generate stub object 326 which provides the interface 340 for remote object OBJ_C 316 and passes calls to OBJ_C 316.

Figure 11:
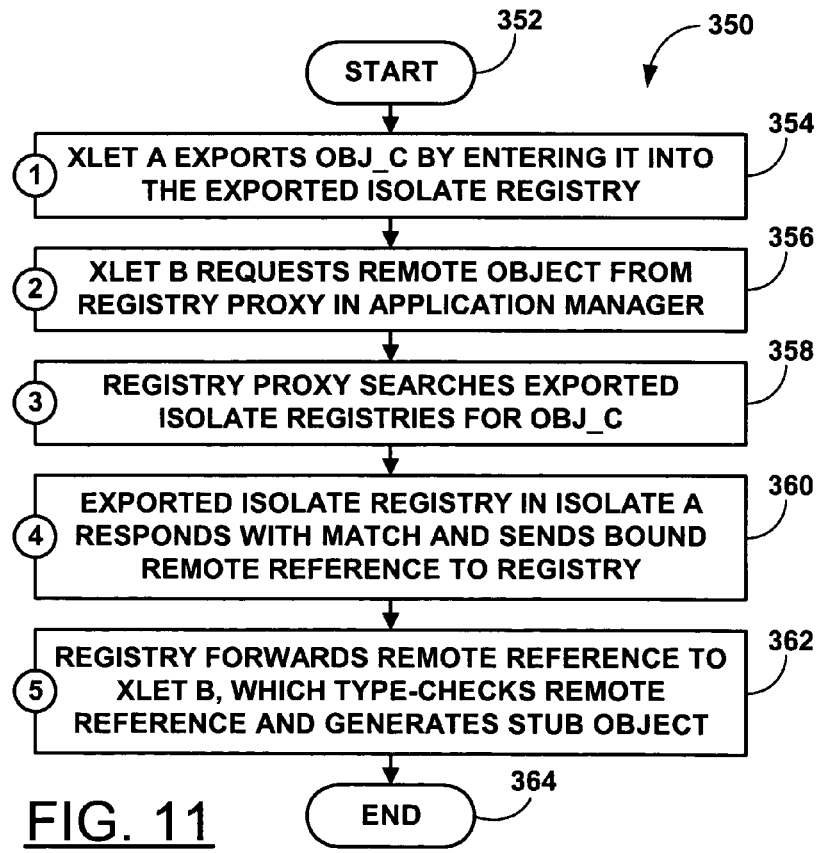
FIG. 11 shows a flowchart illustrating an exemplary procedure for implementing IXC between two Xlets with a distributed registry.

FIG. 11 shows a flowchart 350 illustrating an exemplary procedure for implementing IXC between Xlet A 312 and Xlet B 322. The procedure begins as indicated by start block 352 and proceeds to operation 354 wherein Xlet A exports OBJ_C by entering it into the exported isolate registry. In operation 356, at some later time, Xlet B requests the remote object from the registry proxy which is provided by the application manager. In operation 358, the registry proxy, in response to the request from Xlet B, searches exported isolate registries for OBJ_C. The registry proxy obtains control of an exclusive lock during the search, to prevent the exported isolate registries from being modified during the search. In operation 360, the exported isolate registry in isolate A responds to the request from the registry proxy with the remote reference corresponding to OBJ_C. In operation 362, the registry forwards the remote reference to Xlet B, which type-checks the remote reference and generates a stub object corresponding to remote object OBJ_C. In operation 364, the procedure ends.

Although the distributed registry model requires the additional steps of polling the various isolates, this is acceptable in an environment where each isolate exists on the same machine. This is unlike RMI protocols where registry may not be located on the same machine as the remote objects which would make a search of a distributed registry prohibitively long. Since the IXC model is limited to providing communication between Xlets on the same physical machine, the delay associated with the search would be minimal and provide the added advantage of no arbitrary limits on the number of exported objects a particular Xlet can have.

The distributed registry model also potentially simplifies garbage collection. In the typical case, there will only be one Xlet for each isolate. When that Xlet dies, the isolate shuts down and the exported isolate registry disappears with the isolate. Thus, no additional steps are required to remove the registry entries when an Xlet dies in this circumstance. In cases where there is more than one Xlet in an isolate, when the Xlet dies gracefully, it calls a procedure to shut itself off and that will include a call to the exported isolate registry to remove any entries relating to the Xlet being shut down. If an Xlet locks up, e.g., goes into an infinite loop and gobbles up resources, the entire isolate is shut down, including other Xlets operating in that isolate. This removes the exported isolate registry as well.

As for notifying Xlets in other isolates that have imported objects from a dead or dying Xlet, there are two approaches. The first approach is a proactive approach similar to the method discussed above with reference to FIG. 9 wherein the application manager notifies each Xlet that has imported objects from the dead or dying Xlet that the remote objects no longer exist, prompting the corresponding stub objects to be destroyed. This notification could be a broadcast message to all Xlets, or targeted to only those Xlets that have imported objects from the dead or dying Xlet. In another embodiment, in what may be termed a reactive approach to garbage collection of defunct imported objects, the importing Xlets are not notified of the deaths of the remote object until the Xlet attempts to contact the remote object.

Figure 12:
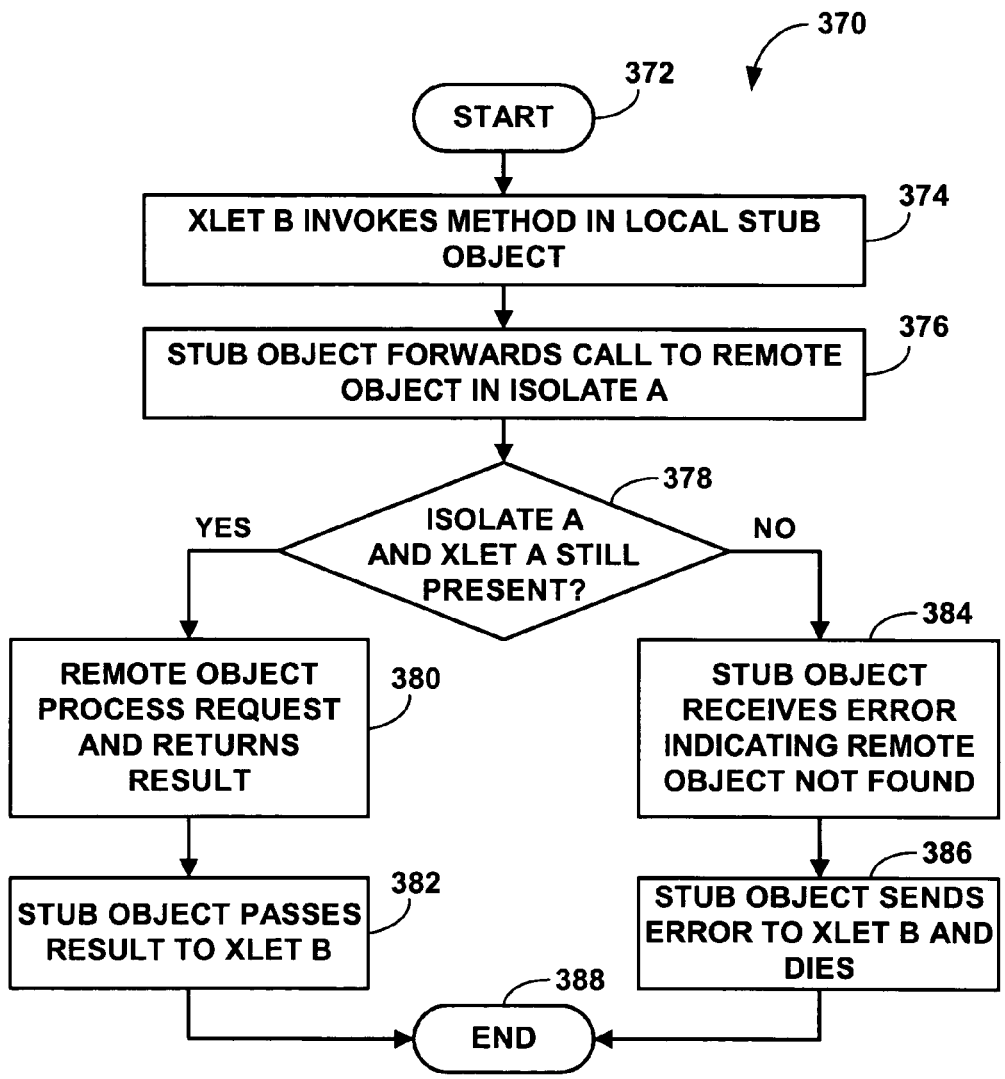
FIG. 12 shows a flowchart illustrating a reactive approach to garbage collection of defunct imported objects.

FIG. 12 shows a flowchart 370 illustrating a reactive approach to garbage collection of defunct imported objects. The procedure begins as indicated by starting block 372 and proceeds to operation 374 wherein Xlet B invokes a method in its local stub object. In operation 376, the local stub object forwards the call to the remote object in isolate A. As shown by operation 378, what happens next depends on whether the remote object exists. If the remote object exists, the procedure proceeds to operation 380 wherein the remote object processes the request and returns a result. Then, in operation 382, the local stub object passes the result to Xlet B. The procedure then ends as shown by ending block 388.

If the remote object no longer exists, either because the Xlet shut down or the isolate shut down, then the stub object receives an error indicating that the remote object was not found in operation 384. This error could be passed by the low level IPC mechanism implemented by the IXC API. Alternatively, it could be generated in response to a time-out error. When the stub object receives this error, it passes it to Xlet B and dies in operation 386. The stub object may terminate itself or be terminated by the Xlet when the Xlet receives the error from the stub object. The procedure then ends as indicated by ending block 388.

Because both Xlets are on the same machine, communication between Xlets is reliable. The IXC protocol is therefore designed to leverage this reliability by providing a simple yet robust IXC infrastructure that satisfies the need for communication between Xlets, without compromising the security fostered by the protected domain provided by the isolates.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a tangible computer readable medium. The tangible computer readable medium is any data storage device that can store data, which can be thereafter be read by a computer system. Examples of the tangible computer readable medium include hard drives, network attached storage (NAS), read-only memory, random-access memory, CD-ROMs, CD-Rs, CD-RWs, magnetic tapes and other optical and non-optical data storage devices. The tangible computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method for managing a registry of bound objects for inter-Xlet communication (IXC), the method comprising:
   receiving a request from a first Xlet to bind an exported object name with a remote reference;
   comparing, using a processor, a number of objects exported by the first Xlet with a maximum number;
   adding, using the processor, a binding for the exported object name and the remote reference to the registry when the number of objects exported is less than the maximum number;
   denying, using the processor, the request when the number of objects exported is not less than the maximum number; and
   sending the remote reference of the added binding to a second Xlet to establish communication between the first Xlet and the second Xlet, the communication including exchanging data between virtual machines, wherein the first Xlet and the second Xlet reside in different isolates with different address spaces.

2. The method of claim 1, wherein the request comprises a remote reference object, the receiving comprising receiving the remote reference object by Object Serialization.

3. The method of claim 1, further comprising:
   receiving a request from a second Xlet for the remote reference of the exported object; and
   sending the remote reference to the second Xlet in response to the receiving of the request from the second Xlet.

4. The method of claim 3, wherein the remote reference includes sufficient information to enable an Xlet in a different isolate to contact the exported object.

5. The method of claim 3 wherein the remote reference further includes an interface descriptor that is representative of a type of the exported object.

6. The method of claim 1, further comprising:
   when an Xlet dies, removing bindings for objects exported by the dead Xlet;
   identifying Xlets that imported the dead Xlet; and
   communicating to the Xlets that imported the dead Xlet that the objects exported by the dead Xlet have died.

7. A computer-implemented method for inter-Xlet communication (IXC), the method comprising:
   sending a remote reference to an exported object from a first Xlet in a first isolate to an object registry located outside the first isolate and outside a second isolate, wherein the first isolate, the second isolate, and the object registry have different address spaces;
   binding, using a processor, the remote reference with a name of the exported object in the object registry;
   sending a request from a second Xlet in the second isolate for a remote reference of the exported object to the object registry;
   responding to the request by forwarding the remote reference to the second Xlet from the object registry;
   instantiating a stub object based on the remote reference at the second Xlet, the stub object being in communication with the exported object, the communication including exchanging data between virtual machines; and
   wherein the object registry limits each Xlet to a selected number of bindings.

8. The method of claim 7, wherein the remote reference is an object and is transmitted between Xlets and the object registry using Object Serialization.

9. The method of claim 7, further comprising:
   type checking the remote reference to ensure that an interface provided by the exported object matches an interface that is expected by the second Xlet; and
   generating a stub class for the interface when the exported object is of a type that has not previously been imported wherein the instantiating the stub object comprises instantiating an instance of the stub class.

10. The method of claim 7, further comprising:
    removing bindings for objects exported by a dead Xlet when the dead Xlet dies;
    identifying Xlets that imported objects exported by the dead Xlet; and
    destroying stub objects corresponding to the objects exported by the dead Xlet.

11. The method of claim 7, wherein the object registry is an object exported by an application manager, the sending a remote reference comprising using IXC to send the remote reference to the object registry.

12. The method of claim 7, wherein the remote reference includes an exporting Xlet identifier, an exporting Xlet endpoint identifier, and an interface descriptor.

13. The method of claim 12, wherein the interface descriptor represents a type of an interface provided by the exported object, the type including a method name, at least one parameter type and a return type for each method.

14. The method of claim 13, further comprising:
    generating a stub class corresponding to the type when there has been no previous objects imported having an identical type, wherein the instantiating the stub object comprises instantiating an instance of the stub class.

15. A non-transitory computer readable media having program instructions for object oriented inter-Xlet communication (IXC) between isolates, the computer readable media comprising:
    program instructions for exporting an object from a first Xlet, the exporting comprising sending a request from the first Xlet to an object registry to bind a name of the exported object with a remote reference;
    program instructions for comparing a number of objects exported by the first Xlet with a maximum number;
    program instructions for adding a binding to the object registry for the name of the exported object and the remote reference when the number of objects exported is less than the maximum number;

program instructions for denying the request when the number of objects exported is not less than the maximum number; and program instructions for sending the remote reference of the added binding to a second Xlet to establish communication between the first Xlet and the second Xlet, the communication including exchanging data between virtual machines, wherein the first Xlet and the second Xlet reside in different isolates with different address spaces.

16. The non-transitory computer readable media of claim 15, wherein the request comprises a remote reference object, the receiving comprising receiving the remote reference object by Object Serialization.

17. The non-transitory computer readable media of claim 15, further comprising:

program instructions for sending a request from a second Xlet to the object registry for the remote reference of the exported object;

program instructions for sending the remote reference to the second Xlet in response to the request from the second Xlet; and program instructions for instantiating a stub object corresponding to the exported object.

18. The non-transitory computer readable media of claim 17, further comprising:

type checking the remote reference to ensure that the interface provided by the exported object matches the interface expected by the second Xlet.

19. The non-transitory computer readable media of claim 17, wherein the remote reference includes sufficient information to enable an Xlet in a different isolate to contact the exported object.

20. The non-transitory computer readable media of claim 19 wherein the remote reference includes an exporting Xlet identifier, an exporting Xlet endpoint identifier, and an interface descriptor.

21. The non-transitory computer readable media of claim 20, further comprising:

program instructions for generating a stub class corresponding to the interface descriptor when no object having an identical interface descriptor has been previously imported; and wherein the program instructions for instantiating the stub object instantiate an instance of the stub class.

22. The non-transitory computer readable media of claim 15, further comprising:

program instructions for removing bindings for objects exported by a dead Xlet when the dead Xlet dies;

program instructions for identifying Xlets that imported the dead Xlet; and program instructions for informing the Xlets that imported the dead Xlet that the objects exported by the dead Xlet have died.

23. The non-transitory computer readable media of claim 15 wherein the object registry is an object exported by an application manager, the sending a remote reference comprising using IXC to send the remote reference to the object registry.

* * * * *